(12) United States Patent
Yoshimura et al.

(10) Patent No.: US 12,085,712 B2
(45) Date of Patent: Sep. 10, 2024

(54) DISPLAY AND METHOD OF PRODUCING DISPLAY

(71) Applicant: TOPPAN PRINTING CO., LTD., Tokyo (JP)

(72) Inventors: Mai Yoshimura, Tokyo (JP); Masashi Kawashita, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 583 days.

(21) Appl. No.: 17/339,059

(22) Filed: Jun. 4, 2021

(65) Prior Publication Data

US 2021/0294096 A1 Sep. 23, 2021

Related U.S. Application Data

(63) Continuation of application No. PCT/JP2019/043971, filed on Nov. 8, 2019.

(30) Foreign Application Priority Data

Dec. 6, 2018 (JP) .................................. 2018-229225

(51) Int. Cl.
*G02B 27/00* (2006.01)
*G02B 5/18* (2006.01)

(52) U.S. Cl.
CPC ....... *G02B 27/0037* (2013.01); *G02B 5/1857* (2013.01); *G02B 5/1866* (2013.01)

(58) Field of Classification Search
CPC .......................... G02B 27/0037; G02B 5/1857; G02B 5/1866; G02B 5/1861; G02B 5/1814; G02B 5/285; G09F 19/205
See application file for complete search history.

(56) References Cited

U.S. PATENT DOCUMENTS 7,306,827 B2 * 12/2007 Li ........................ B01L 3/5085
427/407.1
2015/0219807 A1 * 8/2015 Lochbihler ............ G02B 5/008
359/567

(Continued)

FOREIGN PATENT DOCUMENTS

EP 3 367 140 A1 8/2018
JP 2005-153192 A 6/2005

(Continued)

OTHER PUBLICATIONS

Machine translation of WO-2017068769-A1 (Year: 2017).*
Machine translation of JP-2011218648-A (Year: 2011).*
Machine translation of WO-2016175300-A1 (Year: 2016).*
Office Action dated Dec. 24, 2021 issued in corresponding Japanese Patent Application No. 2020-156524 (10 pages, English translation included).

(Continued)

*Primary Examiner* — William R Alexander
*Assistant Examiner* — Matthew Y Lee
(74) *Attorney, Agent, or Firm* — Foley & Lardner LLP

(57) ABSTRACT

A display with a plurality of display elements each composed of an uneven layer having an uneven structure and a multilayer film layer provided on the uneven structure. A pattern formed by convexities can be divided into shape elements each arranged in each of a plurality of virtual rectangles, when viewed from a direction facing the uneven layer, and each of the shape elements arranged in each of the virtual rectangles is inscribed in the rectangle in which the shape element is arranged. The plurality of virtual rectangles each have sides along a first direction and sides along a second direction orthogonal to the first direction, and a length of the side along the first direction is less than or equal to a sub wavelength.

13 Claims, 4 Drawing Sheets

(56) References Cited

U.S. PATENT DOCUMENTS

| | | |
|---|---|---|
| 2018/0056701 A1 | 3/2018 | Nagano |
| 2019/0333418 A1 | 10/2019 | Kawashita |
| 2021/0294096 A1 | 9/2021 | Yoshimura et al. |

FOREIGN PATENT DOCUMENTS

| | | | | |
|---|---|---|---|---|
| JP | 2011218648 A | * | 11/2011 | ............. B42D 25/21 |
| JP | 2016-212159 A | | 12/2016 | |
| JP | 2018-111253 A | | 7/2018 | |
| JP | 2018-112732 A | | 7/2018 | |
| JP | 2020-091430 A | | 6/2020 | |
| WO | WO-2016175300 A1 | * | 11/2016 | ........... B42D 25/324 |
| WO | WO-2017068769 A1 | * | 4/2017 | ............. B42D 25/29 |
| WO | WO-2018/131665 A1 | | 7/2018 | |

OTHER PUBLICATIONS

Office Action dated Aug. 10, 2021 issued in a corresponding Japanese Patent Application No. 2020-156524, (7 pages).

International Searching Authority, "International Search Report," issued in connection with International Patent Application No. PCT/JP2019/043971, dated Feb. 4, 2020.

International Searching Authority, "Written Opinion," issued in connection with International Patent Application No. PCT/JP2019/043971, dated Feb. 4, 2020.

Extended European Search Report issued in corresponding European Patent Application No. 19893809.4 dated Jan. 7, 2022 (11 pages).

* cited by examiner

DISPLAY AND METHOD OF PRODUCING DISPLAY

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2019/043971, filed on Nov. 8, 2019, which is based upon and claims the benefit of priority to Japanese Patent Application No. 2018-229225, filed on Dec. 6, 2018, the disclosures of which are incorporated herein by reference in their entireties.

TECHNICAL FIELD

The present invention relates to a display and a method of producing the display.

BACKGROUND

Structural colors often observed as the colors of organisms in nature, such as morpho butterflies, are different from colors that are visually recognized due to electronic transitions in molecules, such as colors developed by dyes. Structural colors are visually recognized due to the action of optical phenomena, such as diffraction, interference, and scattering of light, due to the fine structure of objects.

For example, structural colors due to multilayer film interference are generated in such a manner that, in a multilayer film layer in which adjacent thin films have different refractive indices, light reflected at each interface of the multilayer film interferes. Also, multilayer film interference is one of the principles of color development of morpho butterfly wings. In morpho butterfly wings, a fine uneven structure on the surface of the wings causes scattering and diffraction of light in addition to multilayer film interference; thus, a vivid blue color is visually recognized in a wide observation angular range.

PTL 1 discloses a structure that artificially reproduces structural colors of, for example, morpho butterfly wings. PTL1 proposes a structure in which a multilayer film layer is laminated on the surface of a substrate having fine unevenness which are arranged nonuniformly.

In a multilayer film layer, the wavelength of light enhanced by interference changes according to the optical path difference between each layer of the multilayer film layer, and the optical path difference is determined depending on the thickness and refractive index of each layer. The emission direction of light enhanced by interference is limited to a specific direction that depends on the incident angle of incident light. Accordingly, with a structure in which a multilayer film layer is laminated on a flat surface, the wavelength of visually recognized reflected light changes greatly depending on the observation angle; thus, the visually recognized color changes greatly depending on the observation angle.

In contrast, in the structure of PTL 1, a multilayer film layer is laminated on irregular uneven surfaces, and reflected light enhanced by interference thus spreads in multiple directions; thus, color changes depending on the observation angle become gentle. This achieves a color-producing body that exhibits a specific color in a wide observation angular range as in morpho butterfly wings, in the structure of PTL 1.

[Citation List] [Patent Literature] [PTL 1] JP 2005-153192 A

SUMMARY OF THE INVENTION

Technical Problem

The structural color developed by the structure described above can achieve a visual recognition effect different from that achieved by pigment colors. For example, in the structure described in PTL 1, convexities of the uneven structure have a rectangular shape extending in a direction common to the respective convexities when viewed from a direction facing the uneven surface (in planar view), and the length in the long side direction of the convexities is irregular. On the other hand, the length in the short side direction of the convexities is almost constant. That is, the long side direction of the plurality of convexities has anisotropy, and thus the direction in which the reflected light spreads also has anisotropy. Therefore, for example, when the long side direction of the uneven structure is changed for each region, the direction in which the reflected light spreads differs for each region, so that the perspective, such as brightness, of the color developed by the structure, changes depending on the observation position, which makes it possible to prepare a display with high designability.

Further, the uneven structure is formed, for example, by a method of drawing a rectangular pattern on a substrate by electron beam lithography and forming an uneven structure by dry etching or the like, or a method of transferring unevenness of a mold formed by electron beam lithography and dry etching onto a resin layer through nanoimprinting. Electron beam lithography includes a spot beam method in which an electron beam is focused on one point to draw the pattern, and a variable molding method in which an electron beam divided into a rectangular shape to draw the pattern.

The variable molding method makes it possible to draw rectangular shapes along first and second directions orthogonal to each other simultaneously. The convexities of the irregular uneven structure have a rectangular shape extending in a common direction in the respective convexities, when viewed in the direction facing the uneven surface. Therefore, the pattern can be drawn and created at high speed by using the variable molding method.

However, when the long side direction of the uneven structure is changed for each region, a region occurs in which the direction of the side of the rectangular shape forming the respective convexities and the direction of the side of the rectangular shape of the electron beam do not match with each other. In the above region, a shape inclined with respect to the direction of the side of the rectangular shape of the electron beam is drawn. Especially in a region including a diagonal line, the number of shot divisions at the time of drawing increases, which increases the time required to form the uneven structure.

The present invention has been made in light of such circumstances, and a first object is to provide a display with high designability in which shape elements smaller than a wavelength are combined to change the long side direction of convexities in a pseudo manner for each region, so that the perspective of colors differs depending on the observation angle.

A second object is to provide a production method which ensures the production of a display with high designability through a simple process, in which rectangular shapes smaller than a wavelength are combined to change the long side direction of convexities in a pseudo manner while matching a direction of a side of a rectangular shape of an electron beam with a direction of a side of an uneven structure, so that the appearance of colors differs depending on the observation angle.

Solution to Problem

To solve the problems, one aspect of the present invention relates to a display including a plurality of display elements, wherein
the plurality of display elements each include an uneven layer having an uneven structure and a multilayer film layer composed of two or more layers, the multilayer film layer being provided on the uneven layer,
the multilayer film layer has mutually different refractive indexes of adjacent layers,
the uneven layer has a pattern formed by convexities,
the pattern formed by the convexities can be divided into shape elements each arranged in each of a plurality of virtual rectangles, when viewed in a direction facing the uneven layer,
each of the shape elements arranged in each of the virtual rectangles is inscribed in the rectangle in which the shape element is arranged,
the plurality of virtual rectangles each have sides along a first direction and sides along a second direction orthogonal to the first direction,
a length of the side along the first direction is less than or equal to a sub wavelength,
when an angle formed by a direction along the first direction and an arrangement direction of the plurality of virtual rectangles is θ,
the angle θ is constant within each of the display elements, and
at least one of the plurality of display elements has the angle θ of greater than 0° and less than 90°, or greater than 90° and less than 180°.

Another aspect of the present invention relates to a method of producing a display including a plurality of display elements, the method including:
a first step of transferring unevenness which is provided on an intaglio onto a resin-containing layer through nanoimprinting to form an uneven layer on a surface of the layer; and
a second step of forming a multilayer film layer along the uneven layer, and, at that time, forming the multilayer film layer so that refractive indexes of layers adjacent to each other are different from each other, and that a reflectance of light in a specific wavelength range, among incident light on the multilayer film layer, is higher than the reflectance of light in other wavelength ranges, wherein
in the first step, the uneven layer has a pattern formed by a convex,
the pattern formed by the convexities can be divided into shape elements each arranged in each of a plurality of virtual rectangles, when viewed in a direction facing the uneven layer,
each of the shape elements arranged in each of the rectangles is inscribed in the rectangle in which the shape element is arranged,
the plurality of virtual rectangles each have sides along a first direction and sides along a second direction orthogonal to the first direction,
a length of the side along the first direction is less than or equal to a sub wavelength,
when an angle formed by a direction along the first direction and an arrangement direction of the plurality of virtual rectangles is θ,
the angle θ is constant within each of the display elements, and
at least one of the plurality of display elements has the angle θ of greater than 0° and less than 90°, or greater than 90° and less than 180°.

Advantageous Effects of the Invention

According to one aspect of the present invention, the pattern of the convexities, when the uneven structure is viewed in the direction facing the uneven structure, is constituted by shape elements formed so that they are each inscribed in each of plurality of virtual rectangular shapes having sides along the first direction and the second direction which are orthogonal to each other. In at least some of the display elements, adjacent rectangles are arranged along a third direction different from the first direction and the second direction, so that uneven structures different in long axis direction in a pseudo manner can be created. As a result, according to one aspect of the present invention, a display with high designability in which the perspective of colors differs depending on the observation angle is obtained.

Further, according to one aspect of the present invention, a display with high designability can be produced through a simple process, by combining rectangular shapes smaller than a wavelength to change the long side direction of convexities in a pseudo manner while matching a direction of a side of a rectangular shape of an electron beam with a direction of a side of an uneven structure, so that the perspective of colors differs depending on the observation angle.

DETAILED DESCRIPTION

Embodiments of the present invention of will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

With reference to the accompanying drawings, some embodiments of the present invention will be described.

First Embodiment

Next, with reference to FIGS. 1 to 4, a display and a method of producing the same will be described.

The wavelength range of incident light and reflected light on the display is not particularly limited, and the following embodiments will describe, as an example, a display for light in the visible range. In the following description, light in the visible range refers to light in the wavelength range of 360 nm or more and 830 nm or less.

Figure 1:
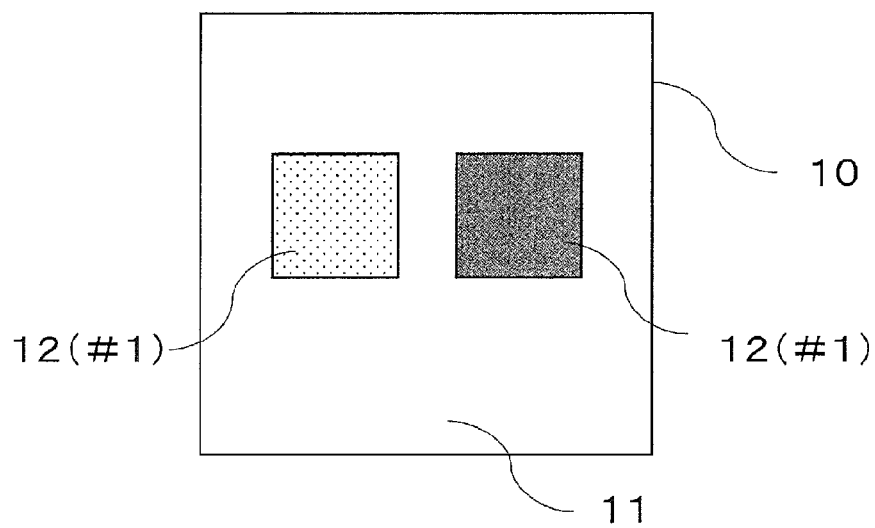
FIG. 1 is a plan view illustrating a surface structure of a display produced by a method according to a first embodiment.

As illustrated in FIG. 1, a display 10 has a plurality of display elements formed on a surface of a substrate. In FIG. 1, for the sake of clarity, only two display elements are illustrated. However, the display 10 of the present embodiment may include three or more display elements. In FIG. 1, the two display elements 12 (#1) and 12 (#2) are illustrated as having the same size. However, the plurality of display elements may have different sizes and contour shapes.

Figure 2:
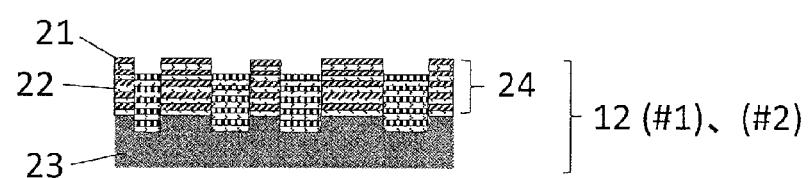
FIG. 2 is a cross-sectional view illustrating a cross-sectional structure of a display element included in the display of FIG. 1.

FIG. 2 is a cross-sectional view illustrating a configuration example of the display element. Specifically, as shown in FIG. 2, the display element includes: an uneven layer having an uneven structure 23 formed on a first surface of a substrate; and a multilayer film layer 24 composed of a plurality of layers, the multilayer film layer being laminated on the uneven structure 23. Further, the multilayer film layer 24 is laminated following the uneven shape of the uneven structure 23, and convexities and concavities of each display element are formed.

Here, as shown in FIG. 2, the uneven structure 23 may be formed on the first surface of the substrate, and the substrate constituting the uneven layer may be formed of a material that absorbs light in a visible light wavelength range.
The Reason for this is as Follows:

As least a part of light transmitted through the multilayer film layer is absorbed by the substrate serving also as an absorption layer, and the transmitted light is prevented from returning to the first surface side. Therefore, when the display is observed from the side facing the surface having the uneven layer, visual recognition of light in a wavelength range different from the reflected light from the multilayer film layer is suppressed; thus, a reduction in the visual recognition of the color of the reflected light can be suppressed in the display elements of the present embodiment.

Here, the uneven structure 23 may be formed on the first surface of the substrate, and a second surface opposite to the first surface of the substrate may be formed of a material that absorbs light in the visible light wavelength range. For example, a layer made of a material that absorbs light in the visible light wavelength range is formed on the second surface of the substrate.
The Reason for this is as Follows:

As least a part of light transmitted through the multilayer film layer is absorbed by the substrate serving also as an absorption layer, and the transmitted light is prevented from returning to the first surface side. Therefore, when the display is observed from the side having the uneven layer, visual recognition of light in a wavelength range different from the reflected light from the multilayer film layer is suppressed; thus, a reduction in the visual recognition of color due to the reflected light can be suppressed.

To create the uneven structure 23 shown in FIG. 2 on the substrate 11, known techniques, such as electron beam or ultraviolet lithography and dry etching, may be used.

The multilayer film layers 24 have mutually different refractive indexes of adjacent layers. The multilayer film layer 24 of the present embodiment has a structure in which high refractive index layers 22 and low refractive index layers 21 are alternately laminated. The high refractive index layer 22 has a higher refractive index than the low refractive index layer 21. The configurations of the multilayer film layer 24, that is, material, thickness, and lamination order of the respective layers constituting the multilayer film layer 24, on the convexities and on the concavities of the uneven structure 23, coincide with each other.

When light is incident on the multilayer film layer 24, light rays reflected at each interface between the high refractive index layer 22 and the low refractive index layer 21 of the multilayer film layer 24 interfere with each other and change traveling direction due to the irregular unevenness on an outermost surface of the multilayer film layer 24. As a result, light in a specific wavelength range is emitted across a wide angular range. The specific wavelength range strongly emitted as reflected light is determined by the materials and thicknesses of the high refractive index layer 22 and the low refractive index layer 21, as well as the width, height, and arrangement of the unevenness.

The high refractive index layer 22 and the low refractive index layer 21 are made of a material that allows light in the visible range to be transmitted therethrough, i.e., a material that is transparent to light in the visible range. The material of these layers is not limited, as long as the high refractive index layer 22 has a higher refractive index than the low refractive index layer 21. The greater the difference in the refractive index between the high refractive index layer and the low refractive index layer, the greater the intensity of reflected light that can be obtained with a smaller number of laminations. From this viewpoint, for example, in the case where the high refractive index layer 22 and the low refractive index layer 21 are each made of an inorganic material, it is preferable that the high refractive index layer 22 be made of titanium dioxide ($TiO_2$) and that the low refractive index layer 21 be made of silicon dioxide ($SiO_2$). However, the high refractive index layer 22 and the low refractive index layer 21 may each be made of an organic material.

The thicknesses of the high refractive index layer 22 and the low refractive index layer 21 may each be designed by using a transfer matrix method or the like depending on the desired color to be developed by the display 10. For example, in the case of a display that exhibits a blue color, the high refractive index layer made of $TiO_2$ preferably has a thickness of approximately 40 nm, and the low refractive index layer 21 made of $SiO_2$ preferably has a thickness of approximately 75 nm.

The details of the uneven structure 23 formed in the uneven layer constituted by the substrate will be described with reference to FIGS. 3(a), 3(b), 3(c), 3(d), and 3(e).

Figure 3A:
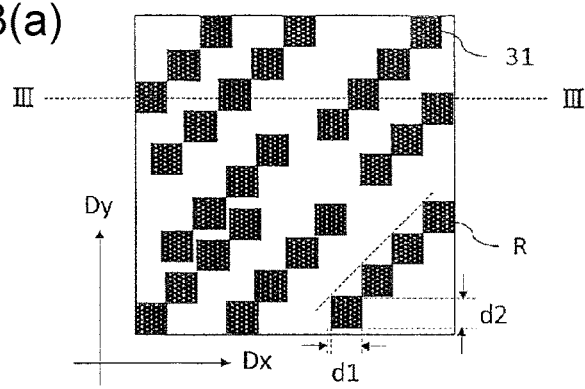
FIG. 3(a), 3(b), 3(c), 3(d), and 3(e) are cross-sectional views explaining a surface structure of the display element included in the display of FIG. 1.
Figure 3B:
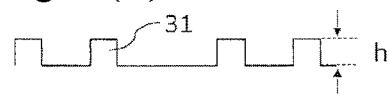
Figure 3C:
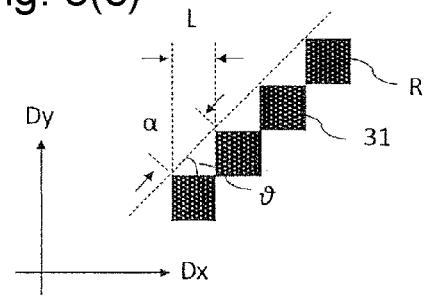

FIG. 3(a) is a plan view of the substrate viewed in the direction facing the surface of the substrate (thickness direction), and FIG. 3(b) illustrates the cross-sectional structure of the substrate taken along the line III-III of FIG. 3(a). FIG. 3(c) is an enlarged view of one of the convexities 31 of FIG. 3(a).

Each of the convexities serving as a display pattern is constituted from a plurality of shape elements R arranged continuously.

Figure 3D:
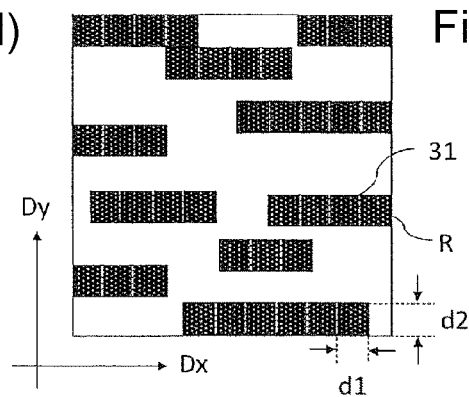
Figure 3E:
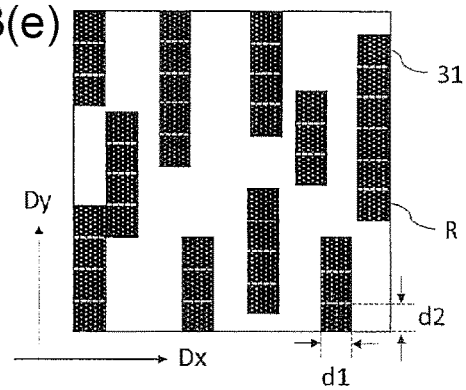
Figure 4B:
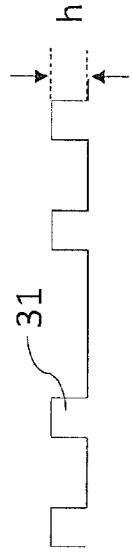
FIGS. 4(a), 4(b), and 4(c) are plan views explaining the surface structure of the display element included in the display of FIG. 1.
Figure 4C:
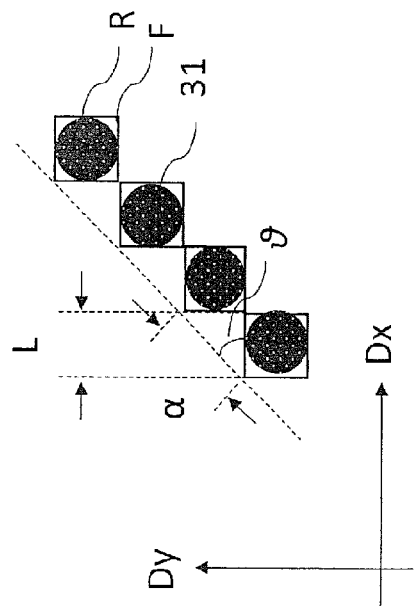
Figure 4A:
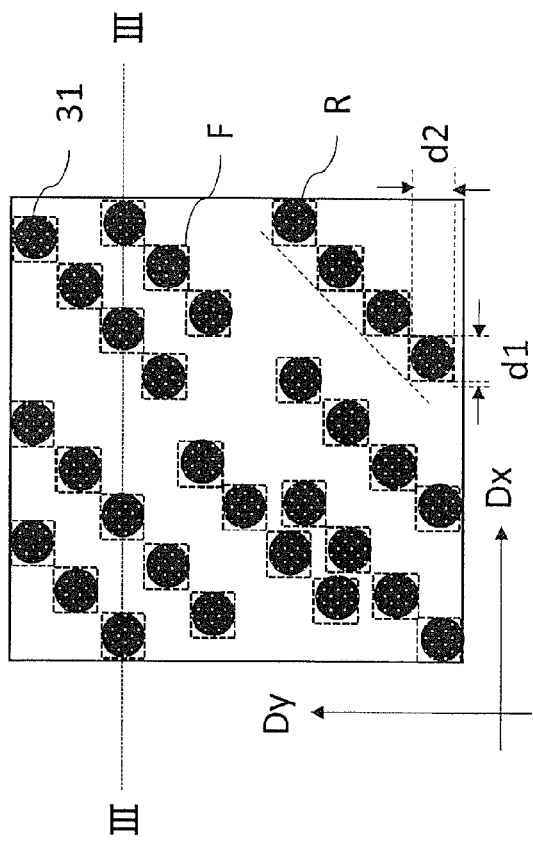

In FIGS. 3(a), 3(b), 3(c), 3(d), and 3(e), the shape elements each have a rectangular shape (the same as a virtual rectangle) for the sake of clarity, but the shape element R has only to be inscribed in a virtual rectangular shape F, and may be a circle or a polygon such as a pentagon, for example, as illustrated in FIGS. 4(a), 4(b), and 4(c). FIG. 4(a) is a plan view of the substrate viewed in the direction facing the surface of the substrate (thickness direction) when the plurality of shape elements are inscribed in the virtual rectangular shapes, and FIG. 4(b) illustrates the cross-sectional structure of the substrate taken along the line III-III of FIG. 4(a). FIG. 4(c) is an enlarged view of one of the convexities 31 of FIG. 4(a).

Here, an angle formed by a virtual straight line passing through the upper left vertices of the adjacent rectangles F and sides of the plurality of rectangles along the first direction is defined as θ. In other words, an angle formed by a direction Dx along the first direction (also referred to as first direction Dx) and an arrangement direction of the plurality of continuous shape elements R constituting one convexity is defined as θ.

This angle θ is set to be constant for each display element.

The reason for this is because the scattered light is reflected in a specific direction by imparting anisotropy in a specific direction to the convexity.

FIG. 3(d) is a plan view of the substrate when θ=0° or 180° as viewed in the direction facing the surface thereof, and FIG. 3(e) is a plan view when θ=90°.

In FIGS. 3(a), (d) and (e), the convexities that constitute the uneven structure are shown dotted.

As shown in FIG. 3(a), the first direction Dx and the second direction Dy are directions contained in a plane along the sides of the virtual rectangles F. The first direction Dx and the second direction Dy are orthogonal to each other.

As shown in FIG. 3(a), when the substrate is viewed from the direction facing the surface thereof (thickness direction), the pattern formed by the convexities can be divided into the plurality of continuous shape elements R. The virtual rectangles F circumscribing the shape elements R are continuous via the sides along the first direction Dx constituting the rectangles F.

In the plurality of rectangles R, a length d1 of the side along the first direction Dx is constant. Light in the visible range, when reflected, preferably has the visible light wavelength or less, and d1 is preferably 300 nm or more and 830 nm or less. For example, in the case of blue-color display elements, d1 is preferably approximately 300 nm.

The length of the side d1 along the first direction Dx in the respective rectangles F is less than or equal to a sub wavelength.

The reason for this is to prevent occurrence of iridescence spectrum.

On the other hand, in the plurality of rectangles F, a length d2 along the second direction Dy satisfies $\tan θ = d2/L$ when the angle θ is greater than 0° and less than 90°, or greater than 90° and less than 180°. The length L refers to a length that satisfies $α \cos θ = L$, where a length of a straight line connecting the upper left vertices of two adjacent rectangles via the side along the first direction Dx is α. The length L may have any precision required in the production process, and, for example, the digits after the decimal point may be discarded.

In FIG. 3(c), the lengths d1 and L along the first direction of the plurality of rectangles coincide, but they do not have to coincide as long as $α \cos θ = L$, as indicated above, is satisfied.

When the angle θ=0° or 180°, L=α, which gives the plan view shown in FIG. 3(d). When the angle θ=90°, L=0 and α=d2, which gives the plan view shown in FIG. 3(d).

A standard deviation of ½ of the sum of the lengths of the sides along the second direction of the rectangles is preferably greater than a standard deviation of the lengths of the side along the first direction.

The reason for this is to prevent scattering of reflected light in all the two-dimensional directions and a reduction in reflectance caused by an increased variation in the length of the side along the first direction or the length of the straight line passing through the center and along the first direction.

In order to efficiently scatter the reflected light from the multilayer film layer 24, it is preferable that ½ of the sum of the lengths d2 of the sides along the second direction Dy of the plurality of shape elements R connected via the sides along the first direction Dx should have a distribution having an average value of 2 μm or more and 4.15 μm or less and a standard deviation of 0.5 μm or more and 1 μm or less.

The respective convexities may have a height h designed to take an appropriate value depending on the wavelength of light reflected at the surface of the display. A diffraction effect can be obtained as long as the height h is larger than the surface roughness of the multilayer film layer described later. However, an excessive increase in the height h strengthens the scattering effect and impairs the chromalevel of the light reflected from the surface of the multilayer film layer. Therefore, in the case of a display in which the target wavelength band is in the visible range, the height h of the respective convexities is preferably 415 nm or less. The value of the height h is more preferably in the range of 10 nm or more and 200 nm or less.

For example, in the case of a blue-color display, the value of the height h is preferably 40 nm or more and 150 nm or less in order to obtain effective light spreading. To control the scattering effect, the height h is preferably 100 nm or less in a blue-color display.

Further, the height h of the convexities may be constant within the respective display elements, and may differ for each display element.

When the convexities of the pattern composed of the plurality of shape elements have different structural heights in each display element, the difference is preferably 5 nm or more. The upper limit is 200 nm or less.

The reason for this is because an excessive increase in structural height excessively increases the scattering effect of reflected light, resulting in weak intensity of the reflected light.

Further, a proportion occupied by the convexities forming the pattern composed of the group of the plurality of shape elements is preferably 40% or more and 60% or less.

The reason for this is because, in order to increase the spread of light reflected by the multilayer film layer, that is, to enhance the scattering effect of the reflected light, the uneven structure preferably has many concaves and convexities.

In the present embodiment, at least one of the plurality of display elements is set so that the angle θ is greater than 0° and less than 90°, or greater than 90° and less than 180°, as shown in FIG. 3(a).

Then, in the display and the method of producing the same according to the present embodiment, in order to induce the spreading effect of light, the pattern of the convexities, when the uneven structure is viewed in the direction facing the uneven structure, is composed of shape elements inscribed in the plurality of rectangular shapes having sides along the first direction and the second direction that are orthogonal to each other. Further, the plurality of shape elements constituting each convexity are arranged along a third direction different from the first direction and the second direction to create uneven structures different in long axis direction in a pseudo manner, so that a display with high designability in which the perspective of colors differs depending on the observation angle is obtained.

Further, when all the patterns formed by the convexities are specified only by the virtual rectangles having the sides along the first direction and the second direction, that is, when the virtual rectangular shapes match with the shape elements inscribed therein, it is possible to draw the patterns at a high speed by using the electron beam lithography of the variable molding method, and create the uneven structures.

Second Embodiment

FIGS. 4(a), 4(b), and 4(c) are cross-sectional views illustrating a configuration example of a pixel element of a display produced by a production method according to the present embodiment. This configuration corresponds to the one shown in FIG. 2 referred to in the first embodiment.

In FIGS. 4(a), 4(b), and 4(c), like reference signs are assigned to like portions described in the first embodiment to avoid duplicate description. The following description is focused on differences from the first embodiment.

Specifically, as shown in the cross-sectional view of FIGS. 4(a), 4(b), 4(c), the display produced by the production method according to the present embodiment is different from the display of the first embodiment in that an uneven structure is formed in a resin layer 32 formed between the multilayer film layer 24 and the substrate 11.

That is, instead of the substrate 11 itself constituting the uneven layer, the resin layer 32 provided on the substrate 11 constitutes the uneven layer.

The resin layer 32 is made of a photosetting resin which is applied onto the surface of the substrate 11 when, for example, forming the uneven structure 23 through optical nanoimprinting.

In the method of producing a display according to the present embodiment, the upper surface of the resin layer 32 made of a photosetting resin is processed to form the uneven structure 23. In this case, it is necessary to prepare a mold for optical imprinting.

In order to prepare an imprinting mold, known techniques, such as electron beam or ultraviolet lithography and dry etching, may be used as described in the first embodiment. Alternatively, for example, a method of preparing an imprinting mold made of Ni may be used in order to prepare an imprinting mold more simply. In this method, a metal film such as of nickel (Ni) is formed on the formed resist pattern, followed by electroforming to dissolve the resist, thereby obtaining the Ni imprinting mold.

With this production method as well, the display member 10 described in the first embodiment can be produced.

EXAMPLES

Details of a method for producing a display as described above and characteristics of the display produced by the production method will now be described as Examples.

Example 1

Next, a display and a method of producing the same in Example 1 will be described. The display elements of the display of Example 1 are constituted from display elements having an uneven structure formed on a substrate as illustrated in FIG. 2.

First, an imprinting mold was prepared. Specifically, because light at a wavelength of 365 nm was used as the light irradiated in the optical nanoimprint method, synthetic quartz that allows light at this wavelength to be transmitted therethrough was used as the material of the mold. In formation of the mold, a film made of chromium (Cr) was first formed by sputtering on the surface of a synthetic quartz substrate, and an electron beam resist pattern was formed on the Cr film by the electron-beam lithography of the variable molding method. The formed pattern was composed of a group of a plurality of shape elements as shown in FIG. 3(a), and the virtual rectangular shape circumscribing the shape elements and the shape of the shape elements matched with each other. The pattern region (each display element) was a square having each side of 50 mm. Since two display elements were prepared as shown in FIG. 1, two uneven structures, i.e., an uneven structure A (uneven structure 23 of the display elements 12 (#1)) and an unevenness structure B (uneven structure 23 of the display elements 12 (#1)), were formed. The length d1 in the first direction of the respective rectangles in FIG. 3(a) of the uneven structure A was 300 nm, and, when an angle formed by a virtual straight line passing through the upper left vertices of the virtual rectangles and a side along the first direction was defined as θ, θ=30°. The length d1 in the first direction of the respective rectangles in FIG. 3(a) of the uneven structure B was 300 nm, and θ=45°.

One half (½) of the sum of the lengths of the sides along the second direction of the plurality of virtual rectangles is a length selected from a normal distribution having an average value of 2000 nm and a standard deviation of 500 nm. In the above pattern, the plurality of rectangles constituting the respective convexities were arranged so that they were not superimposed in the first direction or the second direction. The resist used was a positive type, and the film thickness was set to 200 nm.

Next, the Cr film in the region exposed from the resist was etched with plasma generated by applying high frequency waves to a gas mixture of chlorine ($Cl_2$) and oxygen (02). Subsequently, the synthetic quartz substrate in the region exposed from the resist and the Cr film was etched with plasma generated by applying high frequency waves to hexafluoroethane gas. The etched synthetic quartz substrate had a depth of 80 nm. The remaining resist and Cr film were removed, thereby obtaining a quartz mold in which an uneven structure was formed. A mold release agent, Optool HD-1100 (manufactured by Daikin Industries Ltd.), was applied onto the surface of the mold.

Subsequently, a photocurable resin (PAK-02, produced by Toyo Gosei Co., Ltd.) was applied to the surface of a synthetic quartz wafer used as a substrate. The surface of the mold on which the uneven pattern was formed was pressed against the resin, and light at 365 nm was applied to the rear surface of the mold. After the photocurable resin was cured by irradiation with this light, the synthetic quartz wafer and the resin layer were removed from the mold. Thus, a synthetic quartz wafer was obtained in which the resin layer having an uneven structure was laminated.

Subsequently, the synthetic quartz wafer was etched with plasma using 02 gas to remove the photocurable resin remaining in the concavities of the uneven structure. In this process, 40 sccm of $O_2$ gas was introduced to discharge the plasma. Next, etching with plasma using a gas mixture of octafluorocyclobutane ($C_4F_8$) and argon (Ar) was carried out to transfer the uneven structure of the resin layer to the synthetic quartz wafer. In this process, 40 sccm of $C_4F_8$ gas and 60 sccm of Ar gas were introduced. After the pressure in the plasma chamber was set to 5 mTorr, 75 W of RIE power and 400 W of ICP power were applied to discharge the plasma. The height of the convexities in the uneven structure formed on the synthetic quartz wafer was set to 80 nm.

Next, organic cleaning was carried out using a mixture of dimethyl sulfoxide and monoethanolamine (7:3) (ST-105, produced by Kanto Chemical Co., Inc.), and acid cleaning was carried out using a mixed aqueous solution containing sulfuric acid and aqueous hydrogen peroxide as basic components (SH-303, produced by Kanto Chemical Co., Inc.), thereby obtaining a synthetic quartz wafer, which was a substrate having an uneven structure of the first structure.

Next, $TiO_2$ films having a thickness of 60 nm as high refractive index layers, and $SiO_2$ films having a thickness of 80 nm as low refractive index layers, were alternately formed by vacuum deposition on the surface of the synthetic quartz wafer having unevenness, thereby forming a multilayer film layer having 5 pairs of the high refractive index layers and the low refractive index layers, i.e., 10 layers. The display of Example 1 was obtained in this manner.

The display of Example 1 was observed from the side where the multilayer film was laminated. Specifically, when the display element 12 (#1) was observed from a direction inclined 30° with respect to the display element, a blue color was visually recognized most brightly. When the display element 12 (#2) was observed from a direction inclined 45° with respect to the display element, a blue color was also visually recognized most brightly.

Example 2

Figure 5:
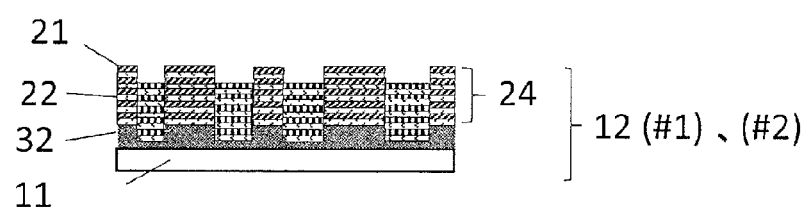
FIG. 5 is a cross-sectional view illustrating a cross-sectional structure of a display element included in a display produced by a method according to a second embodiment.

Next, a display and a method of producing the same in Example 2 will be described. The display of Example 2 was constituted from display elements having an uneven structure formed on a resin layer on the substrate as illustrated in FIG. 5.

First, an imprinting mold was prepared. Specifically, because light at a wavelength of 365 nm was used as the light irradiated in the optical nanoimprint method, synthetic quartz that allows light at this wavelength to be transmitted therethrough was used as the material of the mold. In the formation of the mold, a film made of chromium (Cr) was first formed by sputtering on the surface of a synthetic quartz substrate, and an electron beam resist pattern was formed on the Cr film by the electron-beam lithography of the variable molding method. The formed pattern was composed of a group of a plurality of shape elements as shown in FIG. 3(a), and the virtual rectangular shape circumscribing the shape elements and the shape of the shape elements matched with each other. The pattern region was a square having sides of 50 mm. Since two display elements were prepared as shown in FIG. 1, two uneven structures, i.e., an uneven structure A (uneven structure 23 of the display elements 12 (#1)) and an unevenness structure B (uneven structure 23 of the display elements 12 (#1)), were formed. The length d1 in the first direction of the respective rectangles in FIG. 3(a) of the uneven structure A was 300 nm, and, when an angle formed by a virtual straight line passing through the upper left vertices of the virtual rectangles and a side along the first direction was defined as θ, θ=30°. The length d1 in the first direction of the respective rectangles in FIG. 3(a) of the uneven structure B was 300 nm, and θ=45°.

One half (½) of the sum of the lengths of the sides along the second direction of the plurality of virtual rectangles is a length selected from a normal distribution having an average value of 2000 nm and a standard deviation of 500 nm. In the above pattern, the plurality of rectangles constituting the respective convexities were arranged so that they were not superimposed in the first direction or the second direction. The resist used was a positive type, and the film thickness was set to 200 nm.

Next, the Cr film in the region exposed from the resist was etched with plasma generated by applying high frequency waves to a gas mixture of chlorine ($Cl_2$) and oxygen ($O_2$). Subsequently, the synthetic quartz substrate in the region exposed from the resist and the Cr film was etched with plasma generated by applying high frequency waves to hexafluoroethane gas. The etched synthetic quartz substrate had a depth of 80 nm. The remaining resist and Cr film were removed, thereby obtaining a quartz mold in which an uneven structure was formed. A mold release agent, Optool HD-1100 (manufactured by Daikin Industries Ltd.), was applied onto the surface of the mold.

Next, a photocurable resin (PAK-02, produced by Toyo Gosei Co., Ltd.) was applied to one surface of a polyester film, which was subjected to adhesion enhancement treatment (Cosmoshine A4100, produced by Toyobo Co., Ltd.). The surface of the mold on which the uneven structure was formed was pressed against the resin, and light at 365 nm was applied to the rear surface of the mold. After the photocurable resin was cured by irradiation with this light, the polyester film and the resin layer were removed from the mold. The polyester film, which was a substrate on which a resin layer having an uneven structure was laminated, was obtained in this manner.

Next, $TiO_2$ films having a thickness of 60 nm as high refractive index layers, and $SiO_2$ films having a thickness of 80 nm as low refractive index layers, were alternately formed by vacuum deposition on the surface of the obtained laminate of the substrate and the resin layer having unevenness, thereby forming a multilayer film layer having 5 pairs of the high refractive index layers and the low refractive index layers, i.e., 10 layers.

The display of Example 2 was observed from the side where the multilayer film was laminated. When the display element 12 (#1) was observed from a direction inclined 30° with respect to the display element, a blue color was visually recognized most brightly. When the display element 12 (#2) was observed from a direction inclined 45° with respect to the display element, a blue color was also visually recognized most brightly.

The scope of the present invention is not limited to the illustrative embodiment illustrated and described above, but also includes all embodiments that provide effects equivalent to those intended by the present invention. Furthermore, the scope of the present invention is not limited to combinations of features defined by the claims, but may be defined by any desired combination of specific features among all the disclosed features.

INDUSTRIAL APPLICABILITY

The display of the present invention can be applied to displays with high designability. In particular, the display of the present invention is expected to be suitably used in the fields of surface decoration and security.

[Reference Signs List] 10 . . . Display; 11 . . . Substrate; 12 (#1), (#2) . . . Display element; 21 . . . Low refractive index layer; 22 . . . High refractive index layer; 23 . . . Uneven structure (substrate); 24 . . . Multilayer film layer; 32 . . . Resin layer (uneven layer); 31 . . . Convex of uneven structure; Dx . . . First direction; Dy . . . Second direction; R . . . Shape element; F . . . Virtual rectangle.

What is claimed is:

1. A display with a plurality of display elements, comprising:
the plurality of display elements each comprising an uneven layer having an uneven structure and a multilayer film layer composed of two or more layers, the multilayer film layer being provided on the uneven layer,
the multilayer film layer has mutually different refractive indexes of adjacent layers,
the uneven layer has a pattern formed by convexities,
the pattern formed by the convexities can be divided into shape elements each arranged in at least one of a plurality of virtual rectangles, when viewed in a direction facing the uneven layer,
each of the shape elements arranged in each of the virtual rectangles is inscribed in the rectangle in which the shape element is arranged,
the plurality of virtual rectangles each have sides along a first direction and sides along a second direction orthogonal to the first direction,
a length of the side along the first direction is less than or equal to a sub wavelength,
when an angle formed by a direction along the first direction and an arrangement direction of the plurality of virtual rectangles is θ,
the angle θ is constant within each of the display elements, and
at least one of the plurality of display elements has the angle θ of greater than 0° and less than 90°, or greater than 90° and less than 180°,
wherein
a plurality of rectangles connected by the sides along the first direction are provided as virtual rectangles specifying the positions of the shape elements forming the convexities,
an average value of ½ of the sum of the lengths of the sides along the second direction of the plurality of rectangles connected by the sides along the first direction is 4.15 μm or less, and a standard deviation of the lengths is 1 μm or less, and
a standard deviation of ½ of the sum of the lengths of the sides along the second direction of the rectangles is y greater than a standard deviation of the lengths of the side along the first direction.

2. The display of claim 1, wherein the plurality of display elements include a display element having the angle θ of 0° or greater and 180° or less, and a display element having the angle θ of greater than 0° and less than 90°, or greater than 90° and less than 180°.

3. The display of claim 1, wherein a length of the side along the first direction of the rectangle is 830 nm or less, and a height of the convexities forming a pattern composed of a group of the plurality of shape elements is 415 nm or less.

4. The display of claim 1, wherein, in the rectangle, a standard deviation of ½ of the sum of the lengths of the sides along the second direction is greater than a standard deviation of the lengths of the side along the first direction.

5. The display of claim 1, wherein a proportion occupied by the convexities forming the pattern composed of the group of the plurality of shape elements in a region forming each of the display elements is 40% or more and 60% or less, when the uneven structure is viewed in a direction facing a surface of the uneven layer.

6. The display of claim 1, wherein the plurality of display elements include display elements in which the convexities of the pattern composed of the plurality of shape elements have different structural heights, and a difference among the different structural heights is 5 nm or more.

7. The display of claim 1, wherein, in each of the display elements, the height of the convexities forming the uneven structure is constant within each of the display elements.

8. The display of claim 1, wherein, in the multilayer film layer, two layers vertically adjacent to each other are made of materials that allow light in the same wavelength range to be transmitted therethrough and have mutually different refractive indexes in the wavelength range.

9. The display of claim 1, wherein
the uneven structure is formed on a first surface of a substrate, and
the substrate is made of a material that absorbs light in a visible light wavelength range.

10. The display of claim 1, wherein
the uneven structure is formed on the first surface of the substrate, and
a second surface opposite to the first surface of the substrate is made of a material that absorbs light in the visible light wavelength range.

11. The display of claim 1, wherein the multilayer film comprises a plurality of high refractive index layers and a plurality of low refractive index layers, such that high refractive index layers of the plurality of high refractive index layers alternate with low refractive index layers of the plurality of low refractive index layers.

12. The display of claim 1, wherein the uneven structure consists of quartz.

13. A method of producing a display with a plurality of display elements, the method comprising the steps of:
a first step of transferring unevenness which is provided on an intaglio onto a resin-containing layer through nanoimprinting to form an uneven layer on a surface of the layer; and
a second step of forming a multilayer film layer along the uneven layer, and, at that time, forming the multilayer film layer so that refractive indexes of layers adjacent to each other are different from each other, and that a reflectance of light in a specific wavelength range, among incident light on the multilayer film layer, is higher than reflectance of light in other wavelength ranges, wherein in the first step, the uneven layer has a pattern formed by convexities, the pattern formed by the convexities can be divided into shape elements each arranged in each of a plurality of virtual rectangles, when viewed in a direction facing the uneven layer, each of the shape elements arranged in each of the virtual rectangles is inscribed in the rectangle in which the shape element is arranged, the plurality of virtual rectangles each have sides along a first direction and sides along a second direction orthogonal to the first direction, a length of the side along the first direction is less than or equal to a sub wavelength, when an angle formed by a direction along the first direction and an arrangement direction of the plurality of virtual rectangles is θ, the angle θ is constant within each of the display elements, and at least one of the plurality of display elements has the angle θ of greater than 0° and less than 90°, or greater than 90° and less than 180°, wherein a plurality of rectangles connected by the sides along the first direction are provided as virtual rectangles specifying the positions of the shape elements forming the convexities, an average value of ½ of the sum of the lengths of the sides along the second direction of the plurality of rectangles connected by the sides along the first direction is 4.15 μm or less, and a standard deviation of the lengths is 1 μm or less, and a standard deviation of ½ of the sum of the lengths of the sides along the second direction of the rectangles is y greater than a standard deviation of the lengths of the side along the first direction.

* * * * *